US010793082B2

(12) United States Patent
Harris et al.

(10) Patent No.: US 10,793,082 B2
(45) Date of Patent: Oct. 6, 2020

(54) VEHICLE SHIFTER MODULE WITH POP-UP PHONE HOLDER

(71) Applicant: GHSP, Inc., Grand Haven, MI (US)

(72) Inventors: Richard W. Harris, Kentwood, MI (US); John T. Bagley, Grand Haven, MI (US)

(73) Assignee: GHSP, Inc., Grand Haven, MI (US)

( * ) Notice: Subject to any disclaimer, the term of this patent is extended or adjusted under 35 U.S.C. 154(b) by 0 days.

(21) Appl. No.: 16/241,374

(22) Filed: Jan. 7, 2019

(65) Prior Publication Data

US 2019/0210542 A1    Jul. 11, 2019

Related U.S. Application Data

(60) Provisional application No. 62/614,072, filed on Jan. 5, 2018.

(51) Int. Cl.
| | |
|---|---|
| *B60R 11/02* | (2006.01) |
| *F16H 59/12* | (2006.01) |
| *B60K 37/06* | (2006.01) |
| *B60R 11/00* | (2006.01) |
| *F16H 59/08* | (2006.01) |

(52) U.S. Cl.
CPC .......... *B60R 11/0241* (2013.01); *B60K 37/06* (2013.01); *B60R 11/02* (2013.01); *B60R 11/0264* (2013.01); *F16H 59/12* (2013.01); *B60R 2011/001* (2013.01); *B60R 2011/0007* (2013.01); *B60R 2011/0075* (2013.01); *B60R 2011/0082* (2013.01); *F16H 2059/081* (2013.01)

(58) Field of Classification Search
CPC . B60R 11/0241; B60R 11/0264; B60R 11/02; B60R 2011/0007; B60R 2011/001; B60R 2011/0075; B60R 2011/0082; B60R 2011/0005; B60R 2011/0084; B60K 37/06; F16H 59/12; F16H 2059/081
See application file for complete search history.

(56) References Cited

U.S. PATENT DOCUMENTS

| | | | | |
|---|---|---|---|---|
| 5,556,017 A | * | 9/1996 | Troy | ................... B60R 11/0241 224/549 |
| 5,996,866 A | | 12/1999 | Susko et al. | |
| 6,565,137 B1 | * | 5/2003 | Snook | ................... B60N 3/002 108/147 |

(Continued)

*Primary Examiner* — Anita M King
(74) *Attorney, Agent, or Firm* — Price Heneveld LLP

(57) ABSTRACT

A shifter module is provided for a vehicle. The shifter module includes: a substrate adapted for mounting to the vehicle; a shifter knob provided on top of the substrate for enabling a driver to select a gear of the transmission; and a pop-up storage compartment for storing a portable electronic device. The pop-up storage compartment includes: a storage drawer movable between a stowed position and an accessible position within an aperture in the substrate, the storage drawer including a forward support adapted to receive a rear surface of the portable electronic device, the forward support supports the portable electronic device so that a front surface of the portable device is visible to the driver when the storage drawer is in the accessible position; and a rail system extending below the aperture of the substrate for receiving and guiding the storage drawer between the stowed position and the accessible position.

20 Claims, 12 Drawing Sheets

(56) References Cited

U.S. PATENT DOCUMENTS

| | | | |
|---|---|---|---|
| 7,194,087 B2* | 3/2007 | Luginbill | B60R 11/0241 |
| | | | 379/455 |
| 7,794,000 B2* | 9/2010 | Ichimaru | B60R 7/04 |
| | | | 248/311.2 |
| 9,902,338 B2* | 2/2018 | Wirkner | B60R 11/02 |
| 9,902,339 B2* | 2/2018 | Gilling | B60R 11/02 |
| 2017/0217381 A1 | 8/2017 | Gilling et al. | |
| 2019/0383386 A1* | 12/2019 | Harris | G05G 13/00 |

\* cited by examiner

VEHICLE SHIFTER MODULE WITH POP-UP PHONE HOLDER

CROSS-REFERENCE TO RELATED APPLICATION

This application claims priority to and the benefit under 35 U.S.C. § 119(e) of U.S. Provisional Patent Application No. 62/614,072, filed on Jan. 5, 2018, entitled "VEHICLE SHIFTER MODULE WITH POP-UP PHONE HOLDER," by Richard W. Harris et al., the entire disclosure of which is incorporated herein by reference.

FIELD OF THE INVENTION

The present invention generally relates to a shifter module for a vehicle, and more particularly, a shifter module for a center console of a vehicle.

BACKGROUND OF THE INVENTION

There is a demand to provide for storage of a driver's portable phone in a vehicle so that the driver does not have to place the phone on a surface where it can slide off and potentially distract the driver. Also there are competing demands for space in a center console for cup holders and other forms of storage as well as additional control buttons.

SUMMARY OF THE INVENTION

According to one aspect of the present invention, a shifter module is provided for a vehicle having a transmission with various gears that may be selected. The shifter module comprises: a substrate adapted for mounting to the vehicle; a shifter knob provided on top of the substrate for enabling a driver to select a gear of the transmission; and a pop-up storage compartment for storing a portable electronic device. The pop-up storage compartment comprises: a storage drawer movable between a stowed position and an accessible position within an aperture in the substrate, the storage drawer including a forward support adapted to receive a rear surface of the portable electronic device, and a bottom ledge extending rearward from a bottom edge of the forward support, the bottom ledge and the forward support together support the portable electronic device in an upright position so that a front surface of the portable device is visible to the driver when the storage drawer is in the accessible position; a cover disposed on a top edge of the storage drawer, wherein when in the stowed position, the storage drawer is not visible to the driver and the cover extends over the aperture in the substrate; and a rail system extending below the aperture of the substrate for receiving and guiding the storage drawer between the stowed position and the accessible position.

According to another aspect of the present invention, a shifter module is provided for a vehicle having a transmission with various gears that may be selected. The shifter module comprises: a substrate adapted for mounting to the vehicle; a shifter knob provided on top of the substrate for enabling a driver to select a gear of the transmission; and a pop-up storage compartment for storing a portable electronic device. The pop-up storage compartment comprises: a storage drawer movable between a stowed position and an accessible position within an aperture in the substrate, the storage drawer including a forward support adapted to receive a rear surface of the portable electronic device, and a bottom ledge extending rearward from a bottom edge of the forward support, the bottom ledge and the forward support together support the portable electronic device in an upright position so that a front surface of the portable device is visible to the driver when the storage drawer is in the accessible position; and a rail system extending below the aperture of the substrate for receiving and guiding the storage drawer between the stowed position and the accessible position, wherein the forward support is further configured to receive power and function as an inductive charger for charging the portable electronic device when placed in the storage drawer.

According to another aspect of the present invention, a storage module is provided for a vehicle. The storage module comprises: a substrate adapted for mounting to the vehicle; and a pop-up storage compartment for storing a portable electronic device. The pop-up storage compartment comprises: a storage drawer movable between a stowed position and an accessible position within an aperture in the substrate, the storage drawer including a forward support adapted to receive a rear surface of the portable electronic device, and a bottom ledge extending rearward from a bottom edge of the forward support, the bottom ledge and the forward support together support the portable electronic device in an upright position so that a front surface of the portable device is visible to the driver when the storage drawer is in the accessible position; a rail system extending below the aperture of the substrate for receiving and guiding the storage drawer between the stowed position and the accessible position; and a push-push mechanism for manipulating the manner by which the storage drawer moves between the stowed and accessible positions.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION OF THE EMBODIMENTS

Figure 1:
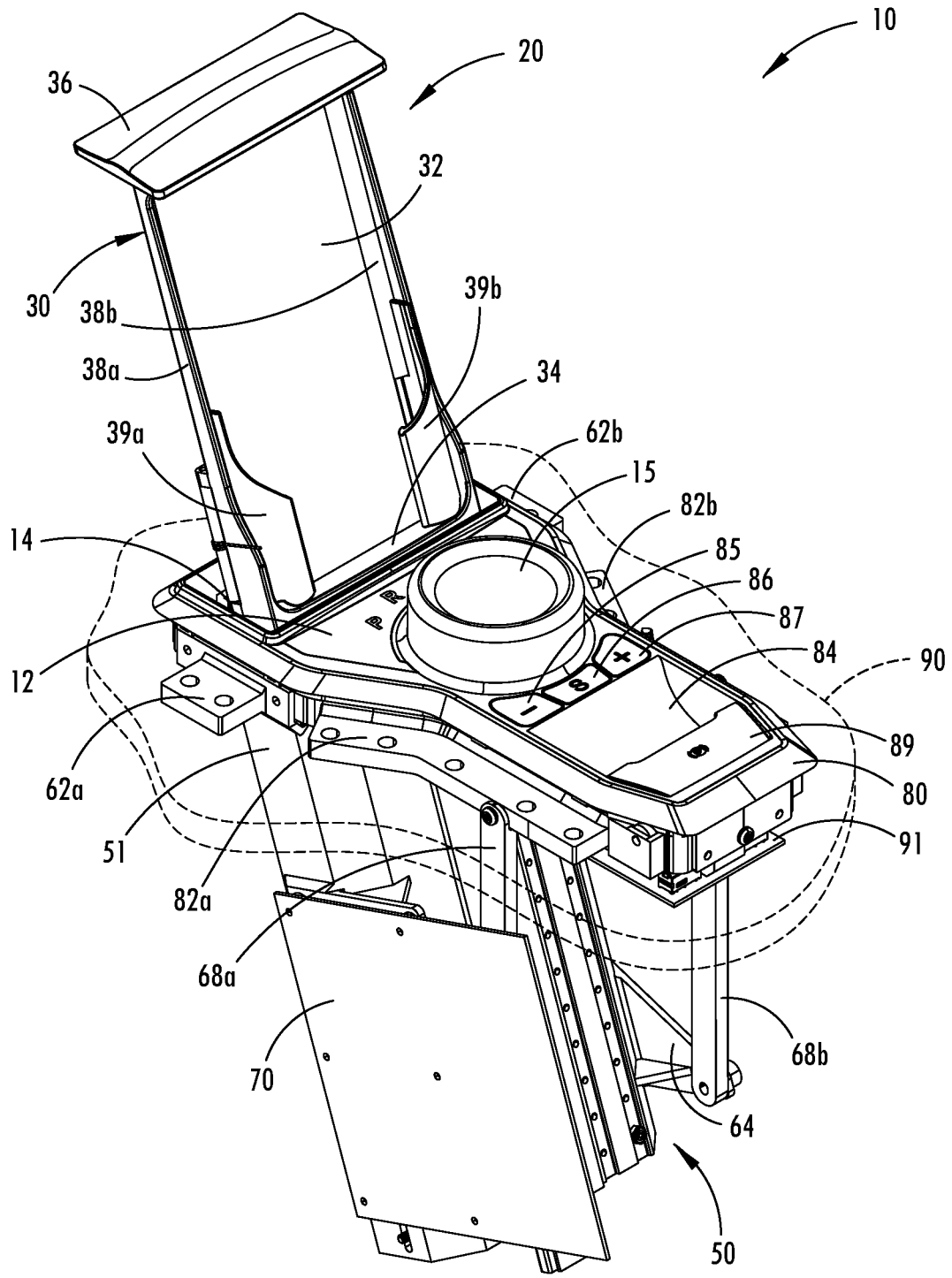
FIG. 1 is a perspective view showing the top, rear, and left sides of a vehicle shifter module according to a first embodiment of the design with a storage drawer in an extended accessible position.
Figure 2:
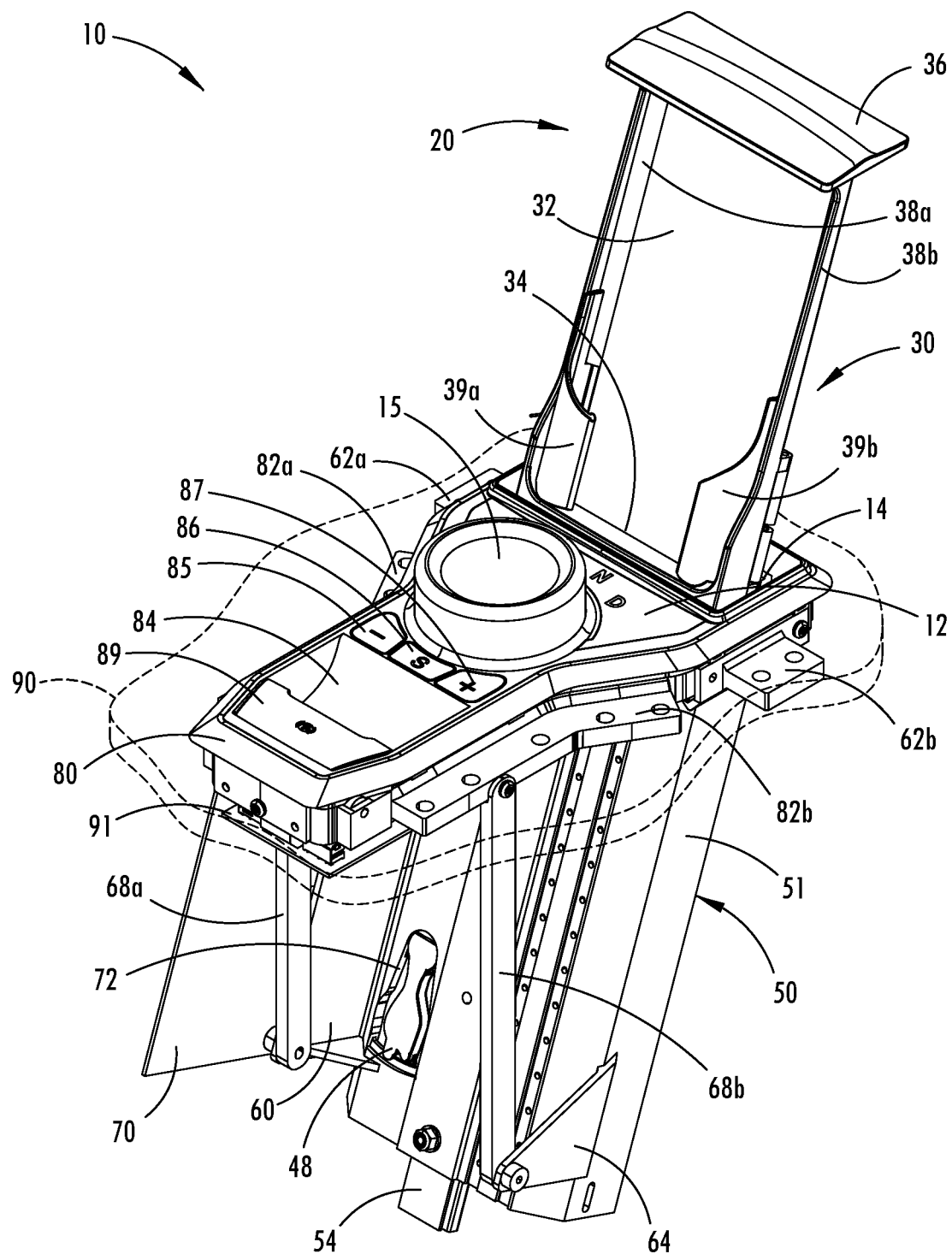
FIG. 2 is a perspective view showing the top, front, and right sides of the vehicle shifter module of FIG. 1 with the storage drawer in the extended position.
Figure 3:
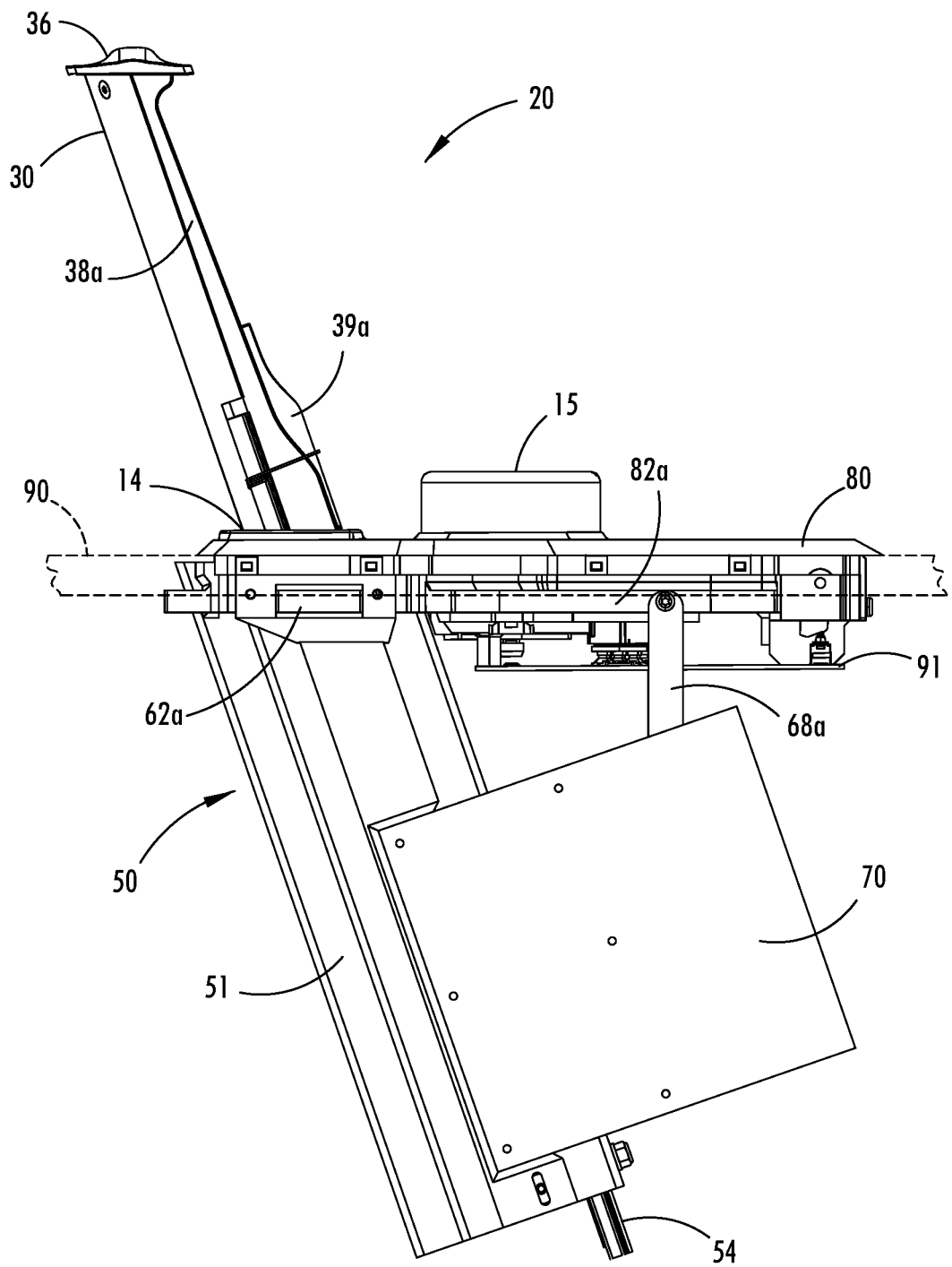
FIG. 3 is an elevation view of a left side of the vehicle shifter module of FIG. 1 with the storage drawer in the extended position.
Figure 4:
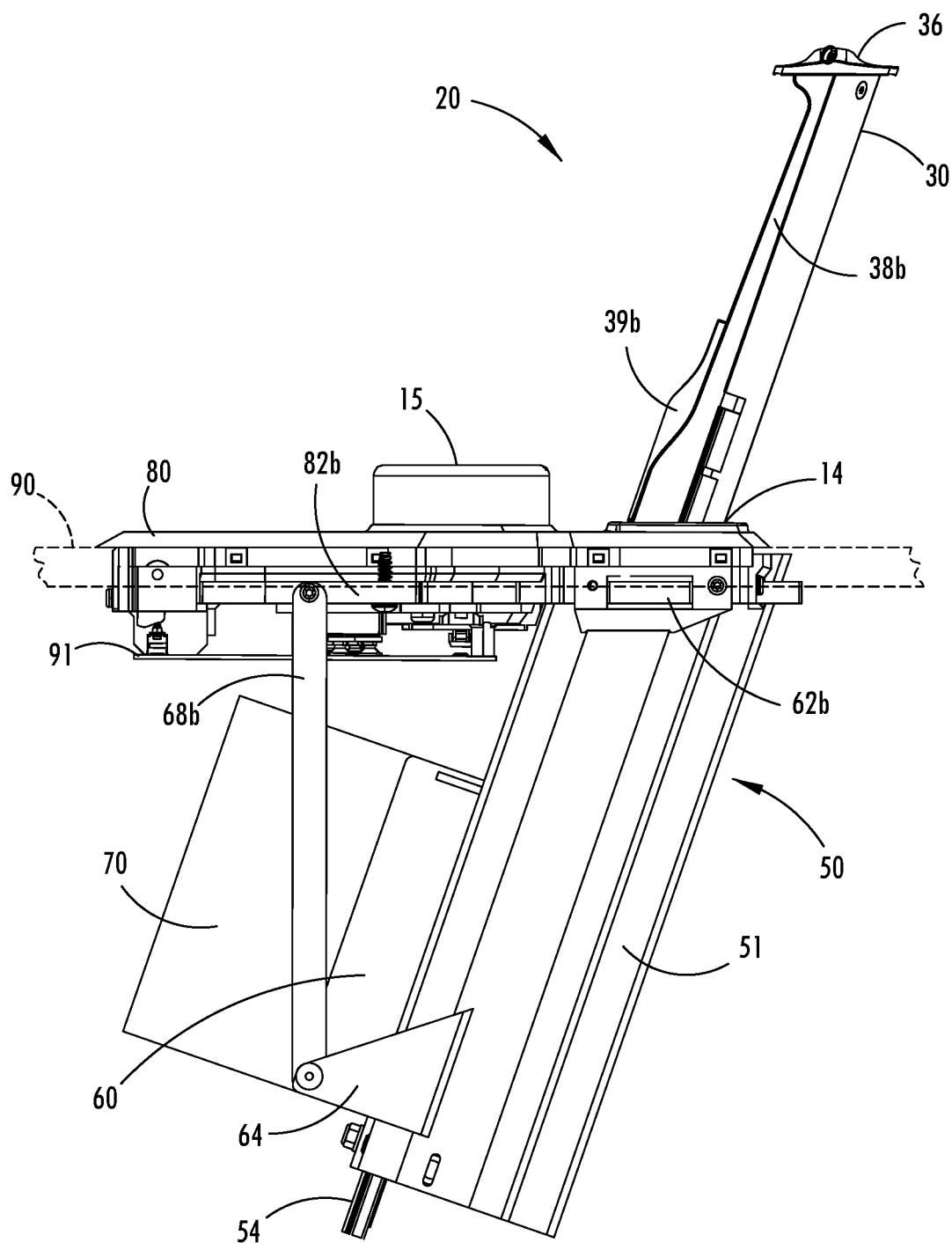
FIG. 4 is an elevation view of a right side of the vehicle shifter module of FIG. 1 with the storage drawer in the extended position.
Figure 5:
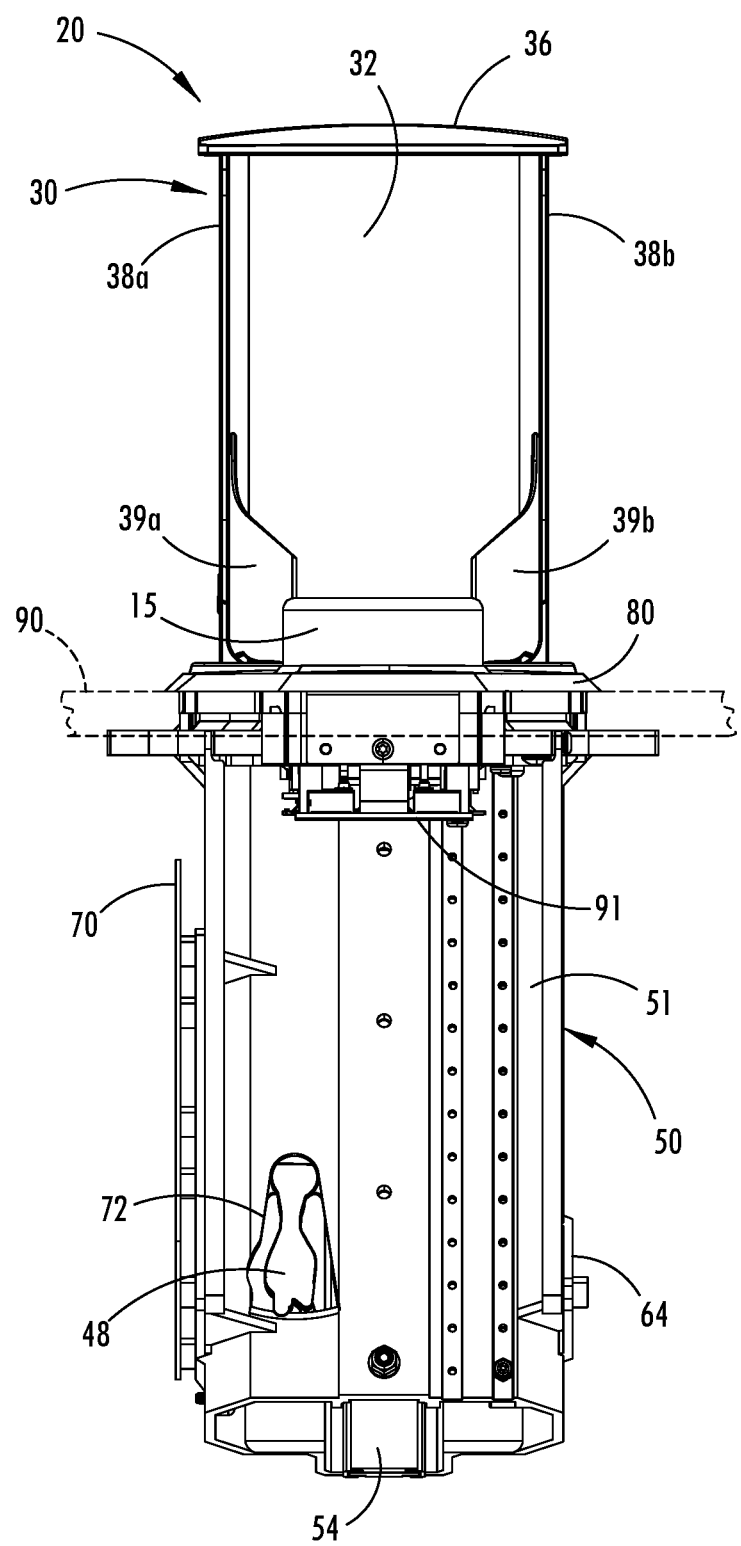
FIG. 5 is an elevation view of a front of the vehicle shifter module of FIG. 1 with the storage drawer in the extended position.
Figure 6:
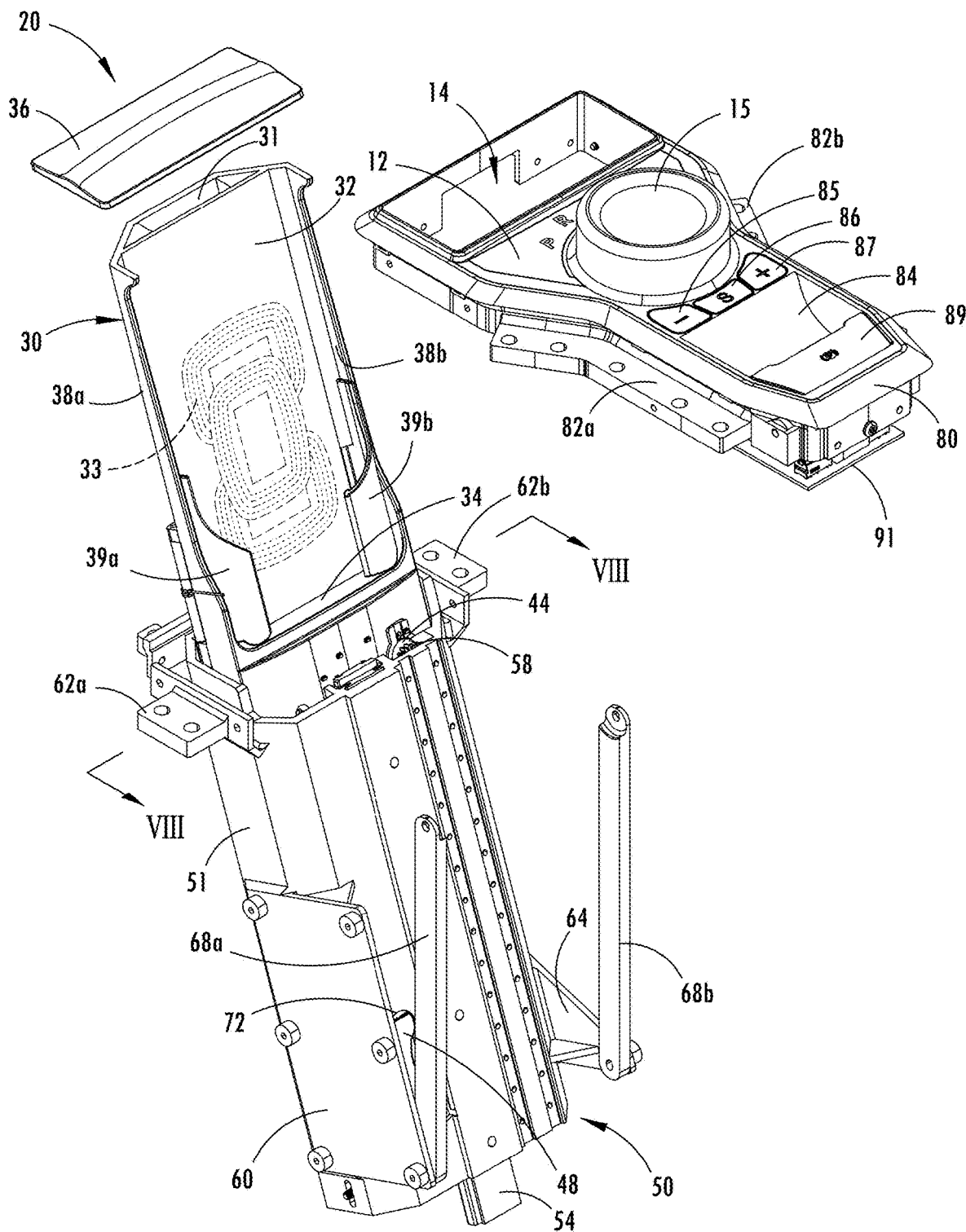
FIG. 6 is a partially exploded perspective view of the rear, top, and left side of the vehicle shifter module of FIG. 1 with a storage drawer in the extended position.

For purposes of description herein the terms "upper," "lower," "right," "left," "rear," "front," "vertical," "horizontal," and derivatives thereof shall relate to the shifter module as oriented in FIG. 1 where the "front of the shifter module is closer to the front of a vehicle in which the shifter module is installed. However, it is to be understood that the device may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 12:
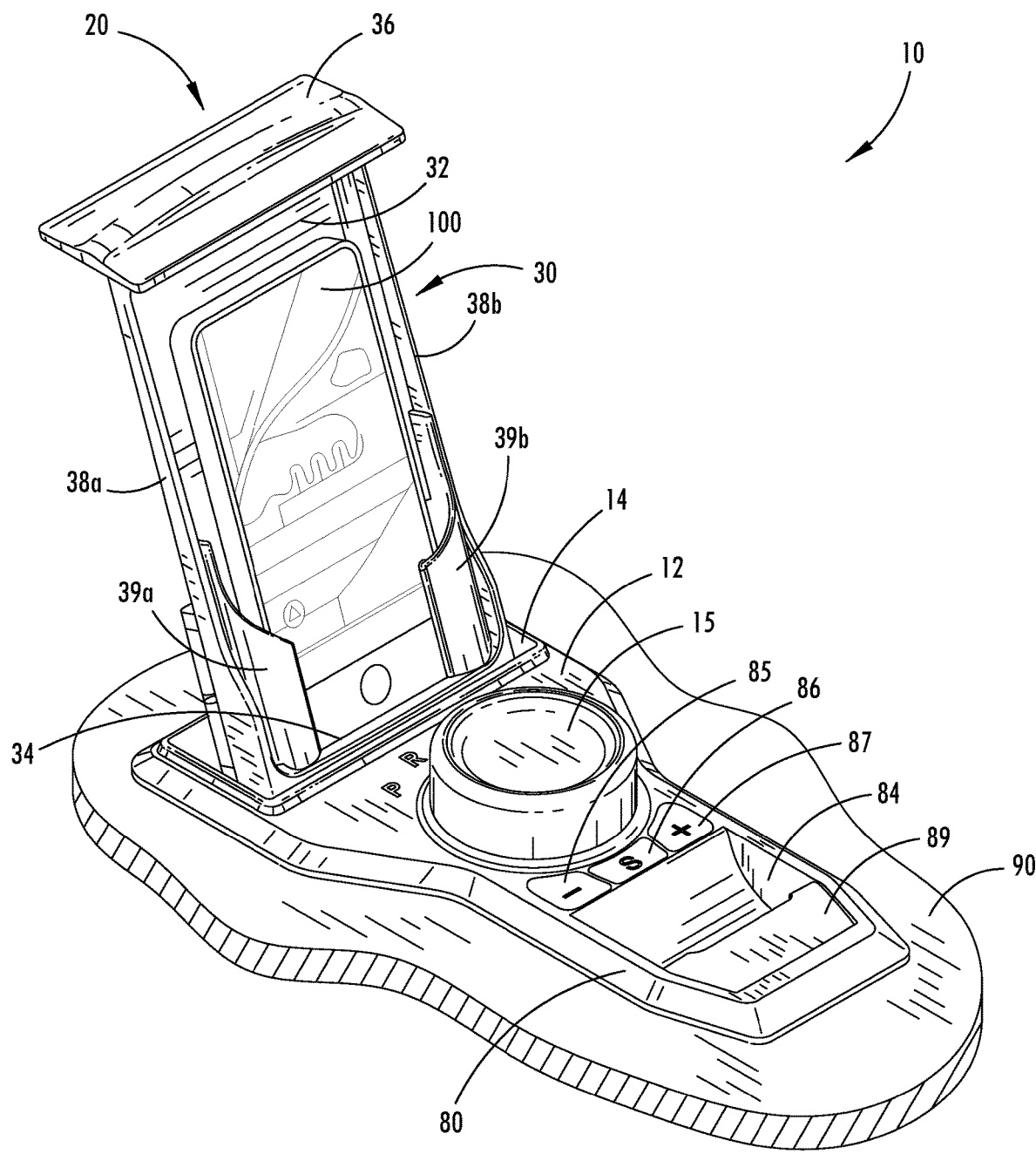
FIG. 12 is a perspective view showing the top, rear, and left sides of a vehicle shifter module of FIG. 1 with a storage drawer in the extended accessible position and with a portable electronic device stored therein.

A shifter module 10 is shown in FIGS. 1-12 for use in a vehicle having a center console and a transmission with various gears that may be selected. The shifter module 10 may include a substrate 12 adapted for mounting to the center console, a shifter knob 15 provided on top of the substrate 12 for enabling a driver to select a gear of the transmission, and a pop-up storage compartment 20 for storing a portable electronic device 100 such as a portable phone (FIG. 12). The pop-up storage compartment 20 includes a storage drawer 30 movable between a stowed position (FIG. 11) and an extended accessible position (FIG. 12) within an aperture 14 in the substrate 12. The storage drawer 30 includes a forward support 32 adapted to receive a rear surface of the portable electronic device 100, and a bottom ledge 34 extending rearward from a bottom edge of the forward support 32, the bottom ledge 34 and the forward support 32 together support the portable electronic device 100 in an upright position so that a front surface of the portable device 100 is visible to the driver when the storage drawer 30 is in the accessible position. As used herein the "front" side of the portable device 100 is the side with a display. This is independent of the front or back of the vehicle.

The pop-up storage compartment 20 may further include a cover 36 disposed on a top edge of the storage drawer 30. When in the stowed position (FIG. 11), the storage drawer 30 is not visible to the driver and the cover 36 extends over the aperture 14 in the substrate 12. As described further below, the pop-up storage compartment 20 may further include a rail system 50 extending below the aperture 14 of the substrate 12 for receiving and guiding the storage drawer 30 between the stowed position and the extended accessible position.

The pop-up storage compartment 20 may include at least one inductive charging coil 33 for charging the portable electronic device 100 when placed in the storage drawer 30. These coils 33 may be disposed in a recess 31 in front of the forward support 12 (see FIG. 6). The shifter module 10 may include one or more indicator lights (not shown) that illuminate when the portable electronic device 100 is being charged.

The vehicle shifter module 10 further includes a body 80 of which the substrate 12 constitutes an upper surface. A pair of mounting flanges 82a and 82b extend outward for allowing mounting of the module 10 in a center console 90. In addition to the shifter knob 15, the upper surface of body 80 may provide a location for plus and minus manual shifting buttons 85-87, an electronic parking brake switch 89, as well as a recess 84 for enabling a driver to access the underside of electronic parking brake switch 89. A main circuit board 91 may be mounted on the underside of the body 80. The main circuit board 91 carries the supporting electronics for the electronic parking brake switch 89, the shifter knob 15, the manual shifting buttons 85-87, and indicator lights for illuminating the PRND or PRNDM letters indicating the gear selections.

The pop-up storage compartment 20 may be implemented as a push-push construction whereby a user pushes down on the cover 36 to release the storage drawer 30 from its stowed position and also pushes down on cover 36 to push the storage drawer 30 from the extended position to the stowed position. Details of this push-push construction are described below. It should be noted that other push-push mechanisms may be used and that other mechanisms besides a push-push mechanism may also be used unless otherwise specified.

Figure 7:
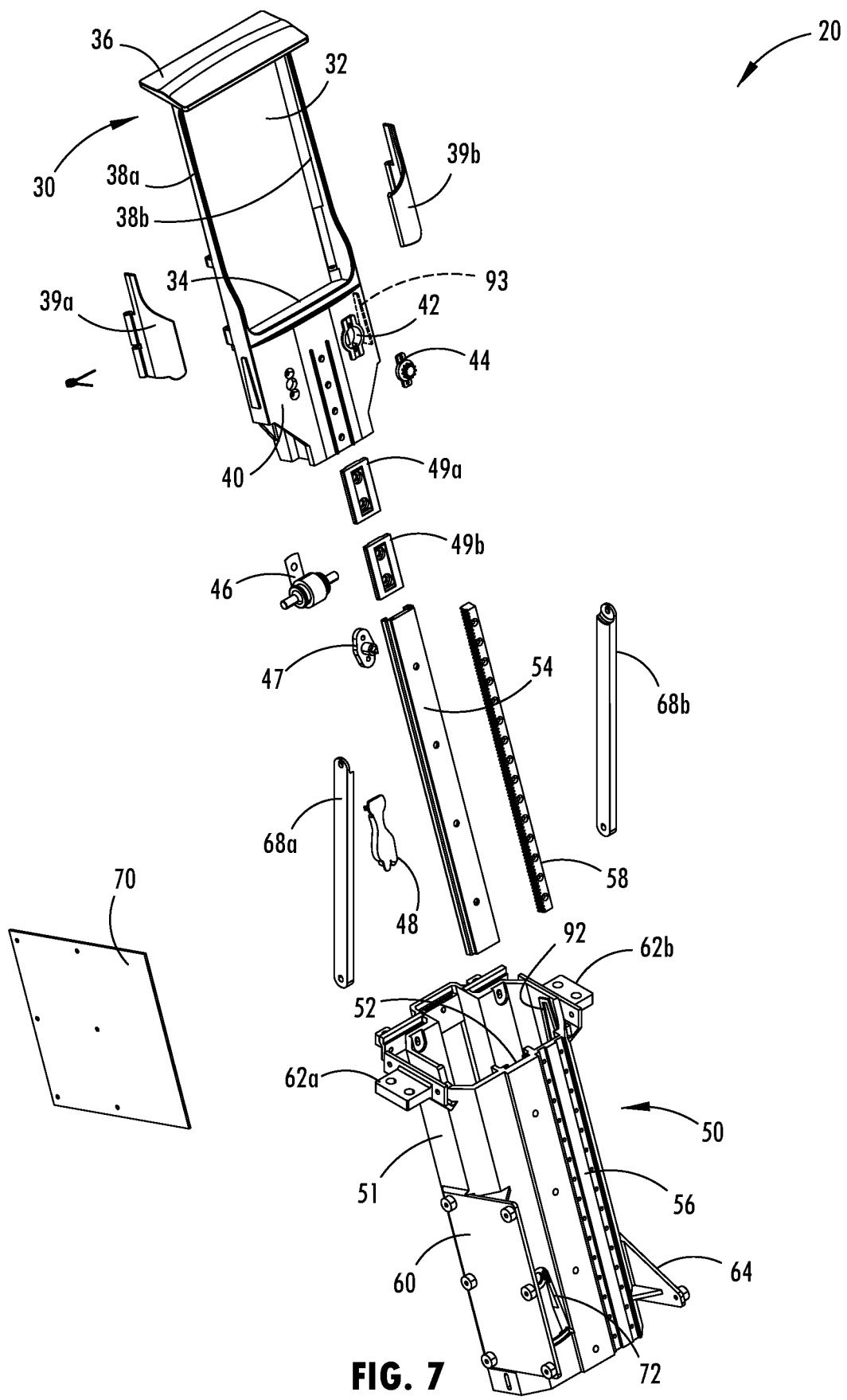
FIG. 7 is a partially exploded perspective view of the rear, top, and left sides of the pop-up storage compartment as used in the vehicle shifter module of FIG. 1.

As best shown in FIG. 7, the rail system 50 includes a housing 51 into which the storage drawer 30 may be moved when in the stowed position. A guide rail 54 is secured to the inside 52 of the housing 51 that extends at least the length of the housing 51. At least one guide member 49a, 49b is secured to a lower body 40 of the storage drawer 30 for slidably guiding the storage drawer 30 along the guide rail 54. A constant force spring 46 is mounted to the lower body 40 of the storage drawer for providing a constant force that pushes the storage drawer 30 upward towards the extended accessible position. A dampening mechanism including a dampening gear 44 and a dampening gear track 58 is provided to slow the rate at which the storage drawer 30 moves upward when released from the stowed position. The dampening gear 44 is mounted within an aperture 42 in the lower body 40 of the storage drawer 30. The dampening gear track 58 is mounted on the inside of housing 51 so as to engage the gear teeth of the dampening gear 44 as the storage drawer 30 is moved up and down inside housing 51.

A push-push latching mechanism is provided to secure the storage drawer 30 when pushed down into the stowed position and to release the drawer from the stowed position when a user pushes downward. The push-push latching mechanism includes a push-push cam 48 that is disposed in an aperture 72 in housing 51 as best shown in FIGS. 8-10A. The push-push cam 48 is mounted to housing 51 at a pivot 74 that allows the cam 48 to pivot. The cam 48 may include a pair of downwardly extending ears 76a and 76b that are on opposite sides of a lip 73 at the bottom of the aperture 72 in which cam 48 is mounted.

Figures 8, 8A:
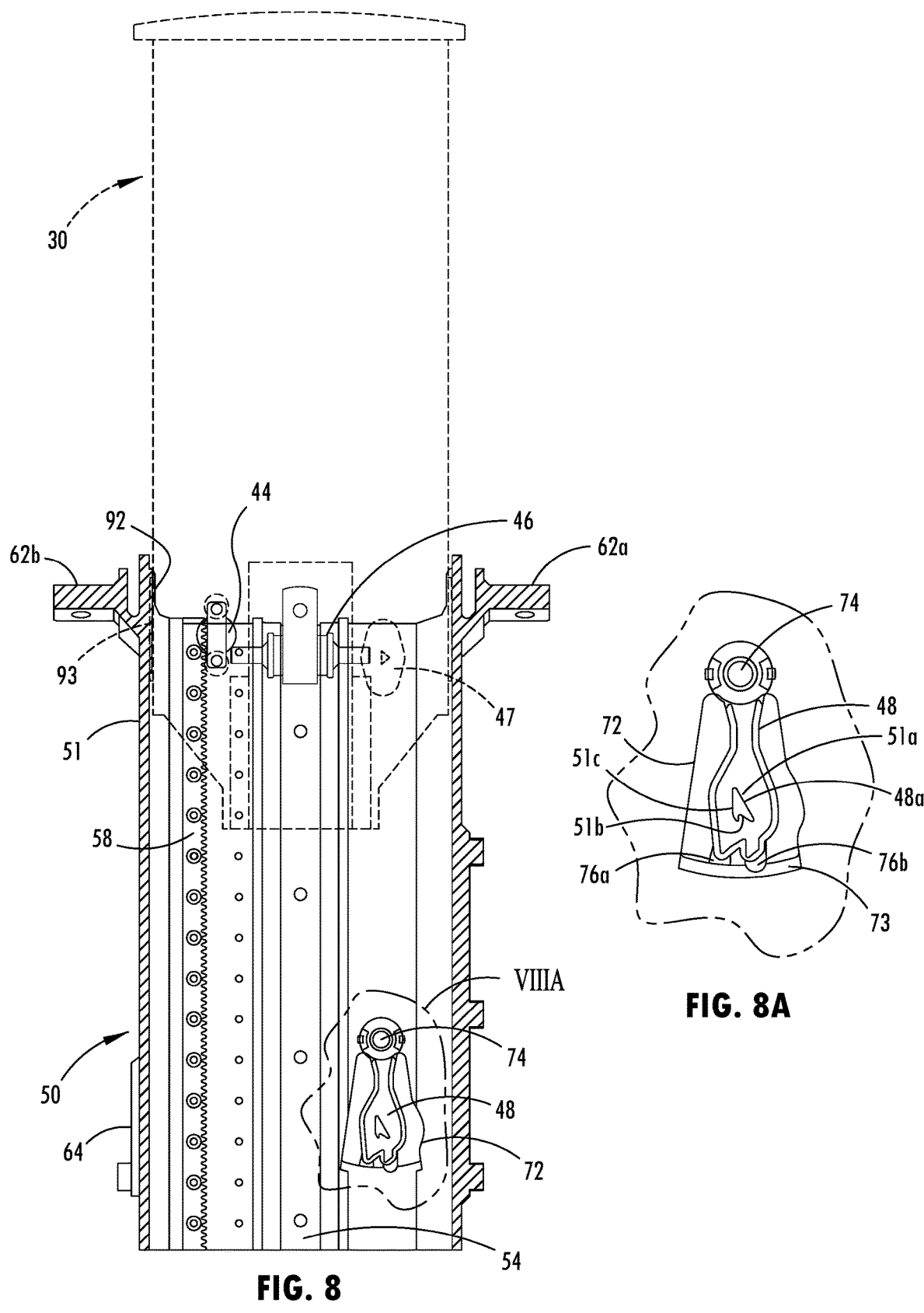
FIG. 8 is a partial cross-sectional view looking from the front towards the rear of the pop-up storage compartment of the vehicle shifter module of FIG. 1 with the storage drawer in the extended position.
FIG. 8A is an enlarged portion of the pop-up storage compartment showing region VIIIA of FIG. 8.
Figures 9, 9A:
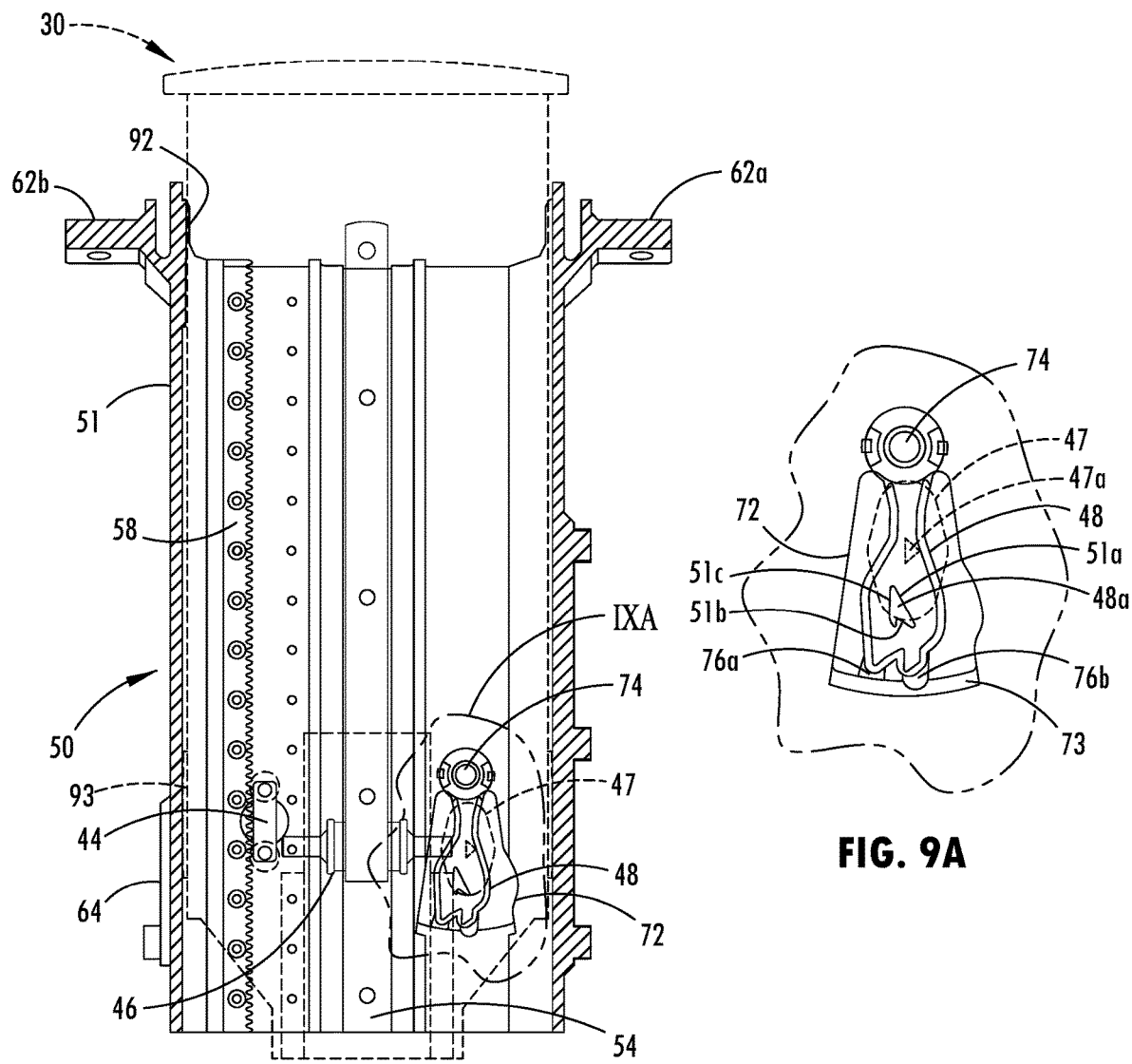
FIG. 9 is a partial cross-sectional view looking from the front towards the rear of the pop-up storage compartment of the vehicle shifter module of FIG. 1 with the storage drawer in the stowed position.
FIG. 9A is an enlarged portion of the pop-up storage compartment showing region IXA of FIG. 9.
Figures 10, 10A:
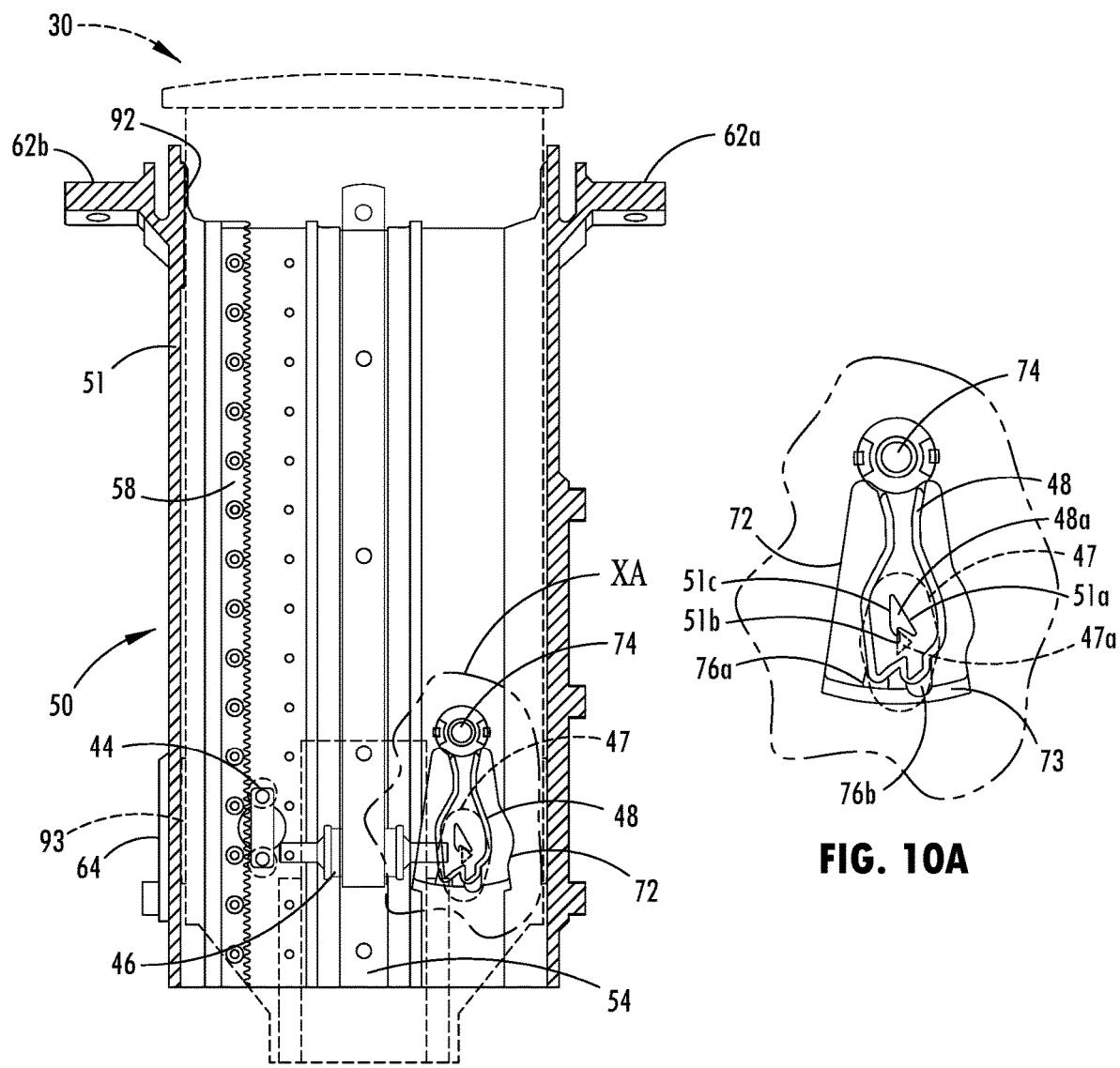
FIG. 10 is a partial cross-sectional view looking from the front towards the rear of the pop-up storage compartment of the vehicle shifter module of FIG. 1 with the storage drawer in the stowed-release position.
FIG. 10A is an enlarged portion of the pop-up storage compartment showing region XA of FIG. 10.
Figure 11:
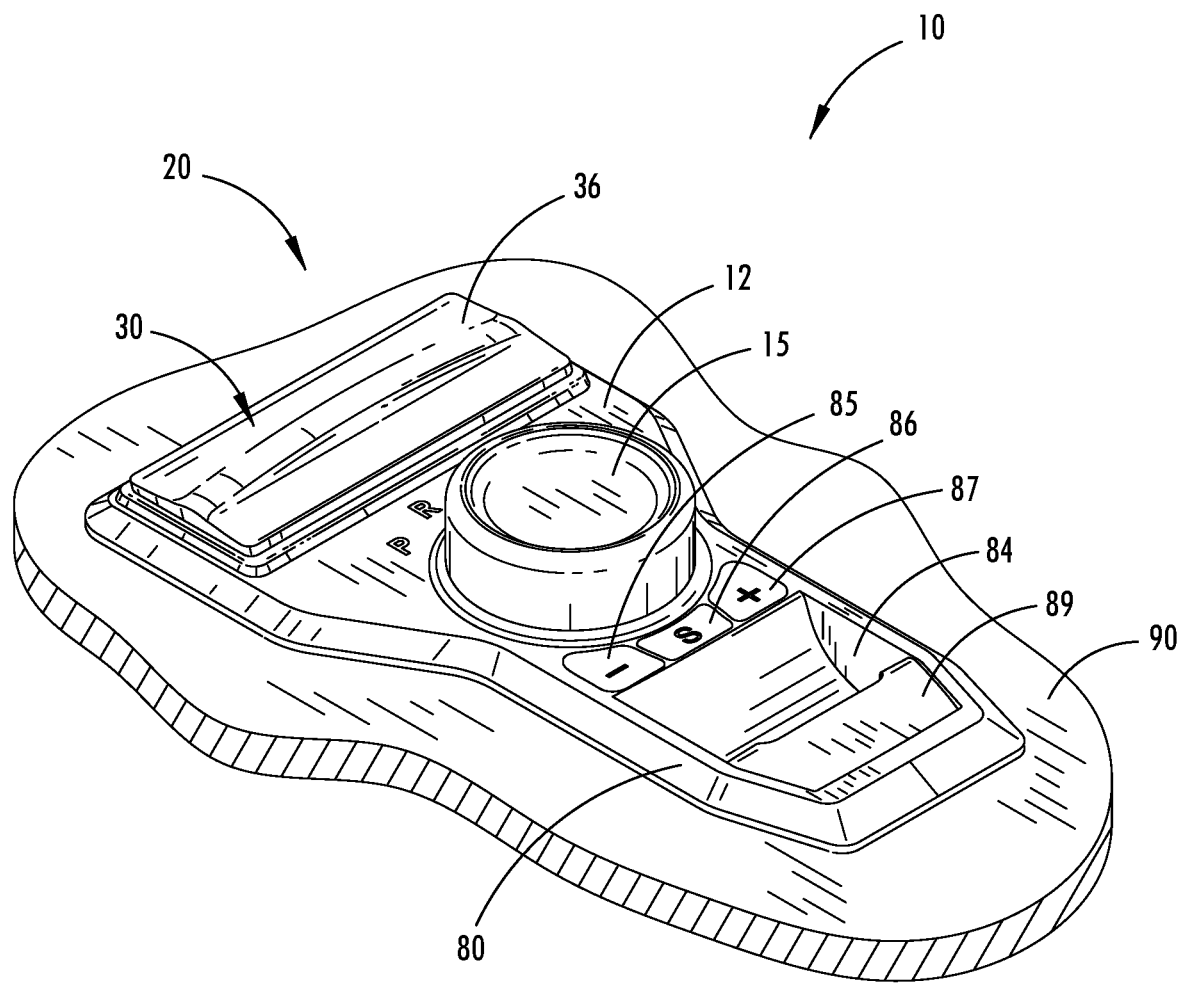
FIG. 11 is a perspective view showing the top, rear, and left sides of a vehicle shifter module of FIG. 1 with a storage drawer in a stowed position.

As shown in FIG. 8A, the cam 48 includes a protruding engagement member 48a that has a first inclined surface 51a, a recessed surface 51b, and a second included surface 51c. As described further below, these surfaces of protruding engagement member 48a are configured to releasably engage a pawl 47 that is mounted on the lower body 40 of the storage drawer 30. Specifically, when the storage drawer 30 is in the extended position shown in FIG. 8, the pawl 47 is a distance away from cam 48. However, as the storage drawer 30 is pushed downward by a user, the pawl 47 moves with the storage drawer 30 downward as illustrated in FIG. 9. At this point, the pawl 47 is near the cam 48 and a protrusion 47a of the pawl 47 moves downward to engage the first inclined surface 51a of the protruding engagement member 48a of the cam 48. Because the first inclined surface 51a is inclined, the cam 48 pivots to the left in FIG. 9A as the pawl 47 moves down. Once the protrusion 47a moves down past the first inclined surface 51a and then moves up as shown in FIG. 10, the protrusion 47a comes to rest in the recessed surface 51b as shown in FIG. 10A. In this position, the storage drawer 30 is secured in the stowed position. When the user wishes to extend and open the storage drawer 30, the user pushes down on the cover 36, which moves the storage drawer 30 and the pawl slightly downward. Then, when the constant force spring 46 pushes the storage drawer upward, the protrusion 47a moves upward, but rather than engaging the recessed surface 51b, the protrusion moves up alongside the second inclined surface 51c and the storage drawer 30 thus is free to move upward all the way to the extended position under the force of the constant force spring 46. A stop 93 may be provided on the lower body 40 of the storage drawer 30 to engage a corresponding slot 92 at the top of the housing 51 to limit the upward movement of the storage drawer 30 beyond the intended extended position and to prevent removal of the storage drawer 30.

Referring back to FIGS. 1-7, the pop-up storage compartment 20 may attach to the body 80 at the opening 14. In addition, two support arms 68a and 68b may be secured to the body 80 in a location forward of the opening 14 and may be secured at their lower ends to either the housing 51 or a strut 64 extending from the housing 51. The pop-up storage compartment 20 may further include a pair of mounting flanges 62a and 62b that extend outward for mounting to the center console 90. The pop-up storage compartment 20 may further include a printed circuit board 70 and a board mount 60 attached to the housing 51. The printed circuit board may include the electronics for charging the portable electronic device through induction coils 33.

The storage drawer 30 may optionally include a pair of opposing side walls 38a and 38b that extend along the sides of front support 32. Optional side wings 39a and 39b may also be provided to help hold the portable electronic device 100 in place.

Although the shifter knob 15 is shown as a rotary shifting knob, a shifting stick or pushbuttons may alternatively be used as may any other form of shifting mechanism such as a capacitive touch shifter of the type disclosed in U.S. Provisional Patent Application No. 62/613,936, the entire disclosure of which is incorporated herein by reference.

Also, while inductive charging is described below, other forms of charging may be provided in the storage drawer 30 such as charging connectors/adapters that physically engage the charging port on the electronic device.

Again, although a push-push mechanism is described herein, other mechanisms, such as powered mechanisms similar to those used for a CD disc tray, may be employed without departing from the spirit and scope of the present invention as defined in the appended claims.

In addition, although a vehicle shifter module is disclosed as being located in a center console, it may be located elsewhere in the vehicle. Further, the pop-up storage compartment may be arranged and configured to pop out horizontally or at any angle as best suited for the mounting of the assembly within any particular location of the vehicle.

The above vehicle shifter module 10 thus provides for storage of a driver's portable phone or other electronic device in the vehicle so that the driver does not have to place the phone on a surface where it can slide off and potentially distract the driver. Also by providing for the ability to push the storage drawer 30 into the stowed position, the vehicle shifter module stores the phone using very little space while utilizing available space within the center console.

It will be further appreciated that the pop-up storage compartment may be provided without the shifter unless otherwise specified.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, and the length or width of the structures and/or members or other elements of the interface may be varied. It should be noted that the elements of the interface may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A shifter module for a vehicle having a transmission with various gears that may be selected, the shifter module comprising:
   a substrate adapted for mounting to the vehicle;
   a shifter knob provided on top of the substrate for enabling a driver to select a gear of the transmission; and a pop-up storage compartment for storing a portable electronic device, the pop-up storage compartment comprising:
a storage drawer movable between a stowed position and an accessible position within an aperture in the substrate, the storage drawer including a forward support adapted to receive a rear surface of the portable electronic device, and a bottom ledge extending rearward from a bottom edge of the forward support, the bottom ledge and the forward support together support the portable electronic device in an upright position so that a front surface of the portable device is visible to the driver when the storage drawer is in the accessible position;
a cover disposed on a top edge of the storage drawer, wherein when in the stowed position, the storage drawer is not visible to the driver and the cover extends over the aperture in the substrate; and
a rail system extending below the aperture of the substrate for receiving and guiding the storage drawer between the stowed position and the accessible position.

2. The shifter module of claim 1, wherein the forward support is further configured to receive power and function as an inductive charger for charging the portable electronic device when placed in the storage drawer.

3. The shifter module of claim 1 and further including a push-push mechanism for manipulating the manner by which the storage drawer moves between the stowed and accessible positions.

4. The shifter module of claim 3, wherein the push-push mechanism includes a constant force spring for forcing the storage drawer upwards.

5. The shifter module of claim 4, wherein the rail system includes a housing into which the storage drawer is moved when in the stowed position.

6. The shifter module of claim 5, wherein the constant force spring is mounted to the storage drawer and rolls upward on an inside of the housing.

7. The shifter module of claim 3, wherein the push-push mechanism includes a latching mechanism to secure the storage drawer when pushed down into the stowed position and to release the storage drawer from the stowed position when the storage drawer is pushed downward.

8. The shifter module of claim 1 and further comprising a stop on the storage drawer to engage a corresponding slot of the housing to limit the upward movement of the storage drawer beyond an extended position and to prevent removal of the storage drawer.

9. A shifter module for a vehicle having a transmission with various gears that may be selected, the shifter module comprising:
a substrate adapted for mounting to the vehicle;
a shifter knob provided on top of the substrate for enabling a driver to select a gear of the transmission; and
a pop-up storage compartment for storing a portable electronic device, the pop-up storage compartment comprising:
a storage drawer movable between a stowed position and an accessible position within an aperture in the substrate, the storage drawer including a forward support adapted to receive a rear surface of the portable electronic device, and a bottom ledge extending rearward from a bottom edge of the forward support, the bottom ledge and the forward support together support the portable electronic device in an upright position so that a front surface of the portable device is visible to the driver when the storage drawer is in the accessible position; and
a rail system extending below the aperture of the substrate for receiving and guiding the storage drawer between the stowed position and the accessible position,
wherein the forward support is further configured to receive power and function as an inductive charger for charging the portable electronic device when placed in the storage drawer.

10. The shifter module of claim 9 and further including a push-push mechanism for manipulating the manner by which the storage drawer moves between the stowed and accessible positions.

11. The shifter module of claim 10, wherein the push-push mechanism includes a constant force spring for forcing the storage drawer upwards.

12. A storage module for a vehicle, the storage module comprising:
a substrate adapted for mounting to the vehicle; and
a pop-up storage compartment for storing a portable electronic device, the pop-up storage compartment comprising:
a storage drawer movable between a stowed position and an accessible position within an aperture in the substrate, the storage drawer including a forward support adapted to receive a rear surface of the portable electronic device, and a bottom ledge extending rearward from a bottom edge of the forward support, the bottom ledge and the forward support together support the portable electronic device in an upright position so that a front surface of the portable device is visible to the driver when the storage drawer is in the accessible position;
a rail system extending below the aperture of the substrate for receiving and guiding the storage drawer between the stowed position and the accessible position; and
a push-push mechanism for manipulating the manner by which the storage drawer moves between the stowed and accessible positions.

13. The storage module of claim 12, wherein the push-push mechanism includes a constant force spring for forcing the storage drawer upwards.

14. The storage module of claim 13, wherein the rail system includes a housing into which the storage drawer is moved when in the stowed position.

15. The storage module of claim 14, wherein the constant force spring is mounted to the storage drawer and rolls upward on an inside of the housing.

16. The storage module of claim 15, wherein the push-push mechanism further comprises a dampening mechanism provided to slow the rate at which the storage drawer moves upward when released from the stowed position.

17. The storage module of claim 14, wherein the rail system further comprises a guide rail mounted to the inside of the housing and at least one guide member mounted on the storage drawer for slidably engaging the guide rail.

18. The storage module of claim 12, wherein the rail system includes a housing into which the storage drawer is moved when in the stowed position.

19. The storage module of claim 12, wherein the push-push mechanism includes a latching mechanism to secure the storage door when pushed down into the stowed position and to release the storage drawer from the stowed position when the storage drawer is pushed downward.

20. The storage module of claim 12 and further comprising a stop on the storage drawer to engage a corresponding slot of the housing to limit the upward movement of the storage drawer beyond an extended position and to prevent removal of the storage drawer.

* * * * *